UNITED STATES PATENT OFFICE.

MAX EMIL DEJONGE, OF STAPLETON, NEW YORK.

ANTI-CORROSIVE AND ANTI-FOULING COMPOUND.

SPECIFICATION forming part of Letters Patent No. 441,291, dated November 25, 1890.

Application filed March 15, 1890. Serial No. 344,033. (No specimens.)

*To all whom it may concern:*

Be it known that I, MAX EMIL DEJONGE, a citizen of the United States of America, residing at Stapleton, Staten Island, county of Richmond, State of New York, have invented and made a new and useful Anti-Corrosive and Anti-Fouling Compound; and I hereby declare that the following is a full, clear, and exact description and specification of the same.

I am aware that paints and compounds have been made previous to my present invention designed to prevent surfaces of metals from corroding by the action of water, gases, &c. I am also aware that others have made compounds designed to prevent barnacles and other deleterious matters from adhering to ships' bottoms called "anti-fouling compounds;" but I am not aware that any of these compounds have been at the same time capable of preventing oxidation or corrosion and fouling, as above stated. My present invention accomplishes both these objects; and it consists in certain compounded ingredients, fully specified and claimed at the end of this specification.

In order that persons skilled in the art may understand, compound, and use my invention, I will proceed to specify the ingredients and the method I employ of compounding them to form the material for the purposes described.

I use in carrying out my invention colophony, paraffine, paraffine-oil, and zinc-dust. Paraffine includes ozocerite and ceresin. The proportions which I find produce the best results are as follows: colophony, one pound, dissolved in paraffine-oil, one-half pound, and combined with melted paraffine, one pound, stiffened with zinc-dust, four pounds, the whole kept in a heated state until reaction has taken place, when it will be ready for use.

This compound is applied to metallic surfaces with a heated trowel in a thin film, and it adheres to the surfaces firmly when cooled, and when properly applied to clean surfaces resists the action of sea-water and deleterious gases. It also resists the attacks of parasites, which attach their shells to all surfaces beneath the water, whether of wood or metal. I apply this compound also to wooden surfaces with good results. This compound has proved itself by long use to be practically perfect for resisting corrosion, and at the same time prevents fouling, and for this cause I call it "anti-corrosive and anti-fouling compound."

Of course the proportions may be somewhat varied without departing from the essence of my invention; but I have specified what I have found to be the best proportions and methods of compounding them.

In some cases I eliminate, preferably, the paraffine, leaving colophony, paraffine-oil, and zinc-dust as the constituent parts. In this case I increase the amount of paraffine-oil.

This compound, when sufficiently heated, may in some cases be used with a very stiff brush.

I am not aware that the peculiar article called "zinc-dust," as distinguished from metallic zinc particles or oxides, and which is a sub-product of the distillation of zinc ores, and composed of various other substances foreign to zinc, and a substance known in the art of zinc-making as "gray zinc-dust," has ever before been used in the manner herein specified.

Having now fully described my invention and my method of compounding and applying it, what I claim as new, and desire to secure by Letters Patent, is—

The anti-corrosive and anti-fouling compound, consisting of colophony, one pound, dissolved in paraffine oil, one-half pound, and these combined with melted paraffine, one pound, stiffened with zinc-dust, four pounds, forming, when reaction has taken place, a thick paste for application to and for the protection of metallic and other surfaces, substantially as specified.

MAX EMIL DEJONGE.

Witnesses:
W. L. BENNEM,
JAMES M. HICKS.